US010815082B2

(12) United States Patent
Kalm et al.

(10) Patent No.: US 10,815,082 B2
(45) Date of Patent: Oct. 27, 2020

(54) INVENTORY STORAGE MODULE HAVING A CONVEYING LOOP WITH VERTICAL LIFT

(71) Applicant: Amazon Technologies, Inc., Seattle, WA (US)

(72) Inventors: William Scott Kalm, Seattle, WA (US); Benjamin Douglas Garcia, Seattle, WA (US); Vahideh Kamranzadeh, Seattle, WA (US); Dinesh Mahadevan, Lynnwood, WA (US); Seshachalamgupta Motamarri, Redmond, WA (US); Tyson Wittrock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 15/797,562

(22) Filed: Oct. 30, 2017

(65) Prior Publication Data
US 2019/0127159 A1  May 2, 2019

(51) Int. Cl.
*B65G 69/24* (2006.01)
*B65G 1/137* (2006.01)
(Continued)

(52) U.S. Cl.
CPC .............. *B65G 69/24* (2013.01); *B65G 1/133* (2013.01); *B65G 1/137* (2013.01); *G06Q 10/087* (2013.01)

(58) Field of Classification Search
CPC ........ B65G 1/133; B65G 1/137; B65G 69/24; G06Q 10/087
See application file for complete search history.

(56) References Cited

U.S. PATENT DOCUMENTS 1,905,924 A  4/1933  McLauchlan
2,999,579 A  9/1961  Kostrzewa
(Continued)

FOREIGN PATENT DOCUMENTS

DE  2013005 A1  9/1971
DE  2552914 A1  6/1976
(Continued)

OTHER PUBLICATIONS

International Patent Application No. PCT/US2018/013922; Int'l Search Report and the Written Opinion; dated Jun. 21, 2018; 16 pages.
(Continued)

*Primary Examiner* — Saul Rodriguez
*Assistant Examiner* — Ashley K Romano
(74) *Attorney, Agent, or Firm* — BakerHostetler (57) ABSTRACT

In one embodiment, an inventory storage module has a first conveyor segment, a second conveyor segment spaced below the first conveyor segment, a first vertical lift disposed at a first end of the module, and a second vertical lift disposed at a second end of the module. The first and second lifts each transfer inventory carriers between the first and second conveyor segments. The first conveyor segment, the second conveyor segment, the first vertical lift, and the second vertical lift together define a conveying loop in a vertical plane, and the storage module translates inventory carriers around the conveying loop until a desired one of the inventory carriers is presented at one of the first and second module ends. An inventory item can be retrieved from, or stowed in, the desired one of the inventory carriers at the one of the first and second module ends.

16 Claims, 7 Drawing Sheets

(51) Int. Cl.
　　B65G 1/133　　(2006.01)
　　G06Q 10/08　　(2012.01)

(56)　　　　　　References Cited

U.S. PATENT DOCUMENTS

| | | |
|---|---|---|
| 3,184,030 A | 5/1965 | Herbert |
| 3,809,208 A | 5/1974 | Shields |
| 3,904,022 A | 9/1975 | Lutz |
| 4,093,086 A | 6/1978 | Lucas et al. |
| 4,346,803 A | 8/1982 | Haessler et al. |
| 4,372,723 A | 2/1983 | De Coene et al. |
| 4,378,873 A | 4/1983 | Cloudy |
| 4,465,417 A | 8/1984 | Baumann et al. |
| 4,645,058 A | 2/1987 | Meyn |
| 4,934,507 A | 6/1990 | Blocker |
| 4,972,937 A | 11/1990 | Aarts |
| 5,387,064 A | 2/1995 | Cardinal |
| 5,465,827 A | 11/1995 | Nakagawa et al. |
| 5,472,309 A | 12/1995 | Bernard, II et al. |
| 5,707,199 A | 1/1998 | Faller |
| 6,059,229 A | 5/2000 | Luria |
| 6,098,786 A | 8/2000 | Brumm et al. |
| 6,336,549 B1 | 1/2002 | Jen |
| 6,626,282 B1 | 9/2003 | Nishizawa et al. |
| 6,752,583 B2 | 6/2004 | Rajewski |
| 6,784,391 B2 | 8/2004 | Takizawa |
| 6,814,214 B2 | 11/2004 | Warlow et al. |
| 6,814,221 B2 | 11/2004 | Goussev |
| 7,090,068 B2 | 8/2006 | Matsuo |
| 7,381,022 B1 | 6/2008 | King |
| 7,637,367 B1 | 12/2009 | Cannell |
| 7,798,305 B2 | 9/2010 | Camelli |
| 8,308,418 B2 | 11/2012 | Ma et al. |
| 8,807,320 B2 | 8/2014 | Fortenbery et al. |
| 8,882,433 B2 | 11/2014 | Bonora et al. |
| 8,939,296 B2 | 1/2015 | Weyler et al. |
| 8,972,045 B1 | 3/2015 | Mountz et al. |
| 9,028,613 B2 | 5/2015 | Kim et al. |
| 9,139,363 B2 | 9/2015 | Lert |
| 9,434,558 B2 | 9/2016 | Criswell |
| 9,520,012 B2 | 12/2016 | Stiernagle |
| 9,550,626 B2 | 1/2017 | Parodi et al. |
| 9,718,625 B2 | 8/2017 | Huang |
| 9,796,527 B1 | 10/2017 | Kaukl et al. |
| 2008/0093313 A1 | 4/2008 | Huber |
| 2008/0298943 A1 | 12/2008 | Siegel et al. |
| 2010/0316468 A1 | 12/2010 | Lert et al. |
| 2011/0313811 A1 | 12/2011 | Urban et al. |
| 2012/0118699 A1 | 5/2012 | Buchmann et al. |
| 2015/0175354 A1* | 6/2015 | Kharkover ............... B65G 1/06 414/231 |
| 2015/0178673 A1* | 6/2015 | Penneman ........... B65G 1/0492 104/18 |
| 2015/0352721 A1 | 12/2015 | Wicks et al. |
| 2015/0360865 A1 | 12/2015 | Massey |
| 2016/0075512 A1 | 3/2016 | Lert, Jr. |
| 2016/0178033 A1 | 6/2016 | Chung |
| 2016/0214796 A1* | 7/2016 | Stefani ................... B65G 1/137 |
| 2017/0036859 A1* | 2/2017 | Lopes Ribeiro ....... B65G 1/137 |
| 2017/0107056 A1 | 4/2017 | Kadaba et al. |
| 2017/0225890 A1 | 8/2017 | Li |
| 2018/0037410 A1* | 2/2018 | DeWitt ................... B07C 3/087 |
| 2018/0201445 A1* | 7/2018 | Battles ................ B65G 1/1373 |
| 2018/0215534 A1* | 8/2018 | Munholland .......... B65G 1/127 |

FOREIGN PATENT DOCUMENTS

| | | |
|---|---|---|
| DE | 3941754 A1 | 6/1991 |
| DE | 102013008872 A1 | 11/2014 |
| FR | 2292646 A1 | 6/1976 |
| GB | 1516120 A | 6/1978 |
| JP | S54-031175 A | 3/1979 |
| JP | 61-114907 A | 6/1986 |
| JP | H01-162611 A | 6/1989 |
| JP | H05-294181 A | 11/1993 |
| JP | H05-294412 A | 11/1993 |
| JP | H05-319517 A | 12/1993 |
| WO | WO 2002/074663 A1 | 9/2002 |
| WO | WO 2007/036250 A1 | 4/2007 |
| WO | WO 2014/092145 A1 | 6/2014 |
| WO | WO 2015/147033 A1 | 10/2015 |

OTHER PUBLICATIONS

International Patent Application No. PCT/US2018/013920; Int'l Search Report and the Written Opinion; dated Jun. 21, 2018; 16 pages.
International Patent Application No. PCT/US2018/013922; Written Opinion; dated Jan. 23, 2019; 8 pages.
U.S. Appl. No. 15/408,128, filed Jan. 17, 2017, Battles et al.
U.S. Appl. No. 15/408,207, filed Jan. 17, 2017, Battles et al.
U.S. Appl. No. 15/408,182, filed Jan. 17, 2017, Battles et al.
U.S. Appl. No. 15/721,280, filed Sep. 29, 2017, Kalm et al.
"Vertical Lift Modules—Shuttle XP Family Flexible Storage Solutions in a Compact Footprint"; http://www.kardexremstar.com/us/materials-handling-storage-solutions/vertical-lift-modules.html; kardexremstar; accessed Mar. 16, 2018; 8 pages.
"Modular Diamond Phoenix Horizontal Carousels"; https://www.modula.us/products/modula-diamond-phoenix-horizontal-carousels.html; Modula HC; accessed Mar. 16, 2018; 6 pages.
"Robots are AutoStore's iconic laborers"; http://www.autostoresystem.com/Products/Robot; AutoStore; accessed Mar. 19, 2018; 5 pages.
"3D-Matrix Solution"; https://www.ssi-schaefer.com/en-us/products/order-picking/automated-order-picking/3d-matrix--solution-53844; SSI Schafer; accessed Mar. 19, 2018; 4 pages.
"Dematic Multishuttle 2"; http://www.dematic.com/en-us/supply-chain-solutions/by-technology/storage-systems/dematic-multishuttle-2/; Dematic; accessed Mar. 19, 2018; 6 pages.
"AS/RS Solutions"; https://www.intelligrated.com/solutions/asrs-solutions; Honeywell Integrated; © 2018; accessed Mar. 19, 2018; 2 pages.
"AS/RS Systems for Distribution & Manufacturing"; http://www.cisco-eagle.com/material-handling-systems/asrs-systems; Cisco-Eagle; © 2018; accessed Mar. 19, 2018; 6 pages.
"Power Automation Systems—PowerStor Deep Lane ASRS"; https://www.youtube.com/watch?v=zJOAVOWluro; Power Automation Systems; Sep. 2011; accessed Mar. 19, 2018; 2 pages.
"AutoStore Logistic—Technical presentation"; https://www.youtube.com/watch?v=ivVDMp2bL9c; Aug. 2009; accessed Mar. 19, 2018; 3 pages.
"Scalable multi-level shuttle Navette at Karl Storz: A future-proof investments"; https://www.youtube.com/watch?v=jEyqkQFp1Uw; SSI Schafer; Jun. 2016; accessed Mar. 19, 2018; 2 pages.
"Automated Vertical Carousels"; https://www.youtube.com/watch?v=5STR9jKABxQ; Cisco-Eagle; Dec. 2015; accessed Mar. 19, 2018; 2 pages.

* cited by examiner

Fig.12

INVENTORY STORAGE MODULE HAVING A CONVEYING LOOP WITH VERTICAL LIFT

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

In inventory storage facilities, storage density is an important characteristic. Packing inventory items closer together reduces the overall volume that is needed to store the inventory items. Thus, a smaller building or structure can be used to store inventory items that are packed closer together. Alternatively, in an existing storage facility, increasing density can free up warehouse space that can be used to store additional inventory items, thereby increasing the capacity of the storage facility. Presented herein are inventory storage modules and storage systems that can have a higher storage density than the conventional shelving units discussed above.

Figure 1:
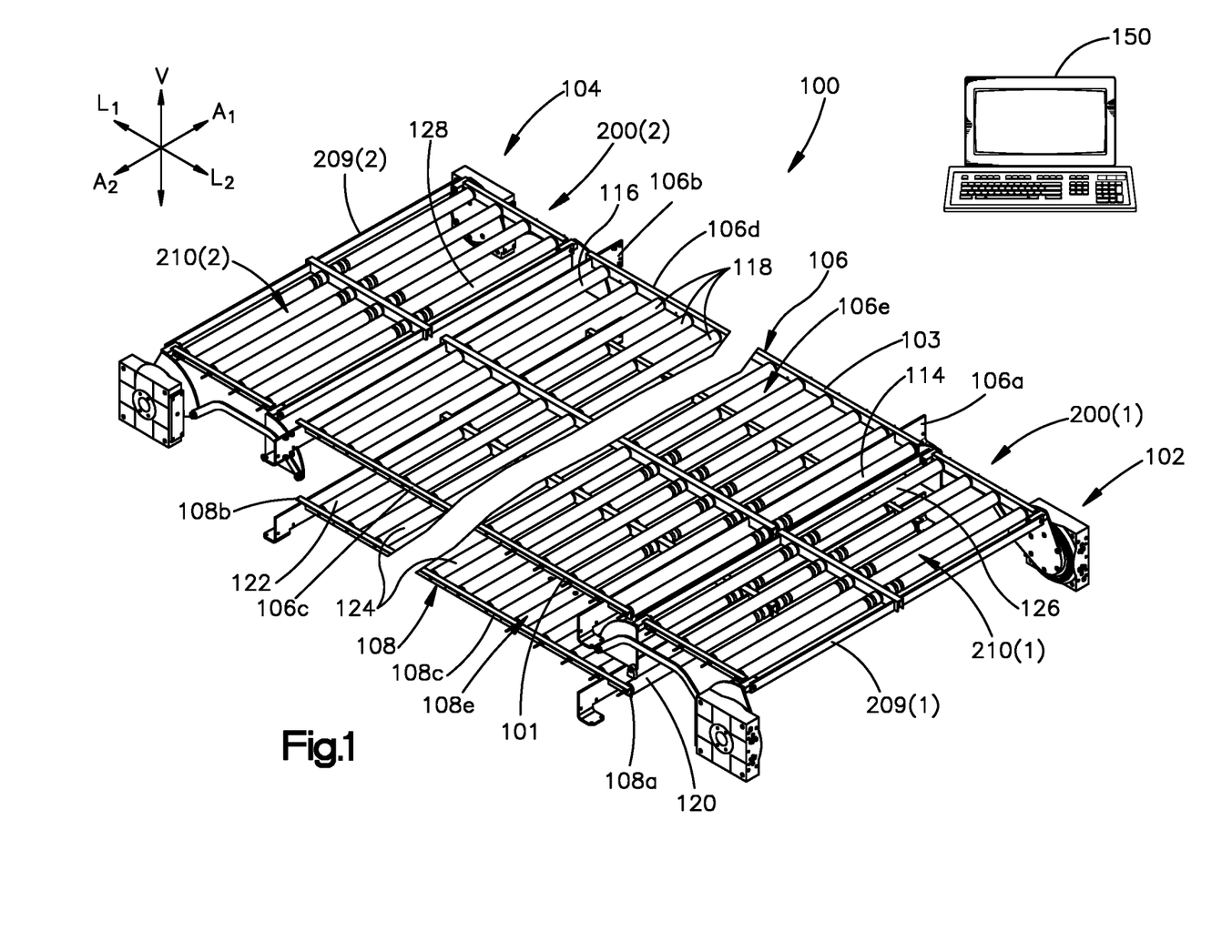
FIG. 1 shows a perspective view of a storage module according to one embodiment.

Referring to FIG. 1, an inventory storage module 100 according to one embodiment is shown that is configured to store inventory items. In general, the storage module 100 has a first module end 102, and a second module end 104 spaced from the first module end 102 along a first longitudinal direction $L_1$. The storage module 100 also has a first module side 101, and a second module side 103 spaced from the first module side 101 along a first lateral direction $A_1$, perpendicular to the first longitudinal direction $L_1$. The storage module 100 can be elongate along the first longitudinal direction $L_1$. For example, the storage module 100 can have a length along the first longitudinal direction $L_1$ that is greater than a width of the storage module 100 along the first lateral direction $A_1$.

The storage module 100 comprises a plurality of conveyor segments, such as a first or upper conveyor segment 106 and a second or lower conveyor segment 108 that are spaced from one another along a vertical direction V that is perpendicular to the first longitudinal direction $L_1$ and the first lateral direction $A_1$. The storage module 100 further comprises a plurality of vertical lifts, such as a first vertical lift 200(1) disposed at the first module end 102 and a second vertical lift 200(2) disposed at the second module end 104. The first and second vertical lifts 200(1) and 200(2) are configured to transfer inventory carriers 300 (see FIG. 2) between the upper and lower conveyor segments 106 and 108. Preferably, the inventory carriers are open-top plastic totes configured to carry items in an e-commerce supply chain. The totes are of a size that an individual person or robot can lift.

The first and second conveyor segments 106 and 108 and first and second vertical lifts 200(1) and 200(2) together define a conveying loop in a vertical plane. The conveyor segments and vertical lifts are configured to translate a plurality of inventory carriers 300 around the conveying loop until a desired one of the inventory carriers 300 is presented at one of the first module end 102 and the second module end 104. At such position, the desired inventory carrier 300 can be accessed by a person or machine such as a robotic arm so that an inventory item can then be placed onto the desired inventory carrier 300 for storage or can be removed from the desired inventory carrier 300 to fulfill a customer order or for further transporting or processing.

In some embodiments, the conveyor segments 106 and 108 and the vertical lifts 200(1) and 200(2) can operate in a unidirectional manner such the inventory carriers 300 can be moved in only a first direction (that is, clockwise or counterclockwise) around the conveying loop. Alternatively, the conveyor segments 106 and 108 and the vertical lifts 200(1) and 200(2) can operate in a bidirectional manner such the inventory carriers 300 can be selectively rotated in one of the first direction and a second direction, opposite the first direction. The movement and positioning of inventory carriers 300 can be controlled by a controller 150, which can be in wired or wireless communication with the segments of the storage module. The controller 150 can control the speed and optionally the direction in which the inventory carriers are translated. Further, the controller 150 can stop translation of the inventory carriers when a desired inventory carrier is presented at one of the first and second ends 102 and 104.

Referring now more specifically to the details of the conveyor segments, the first conveyor segment 106 has a first longitudinal end 106a, and a second longitudinal end 106b that is offset from the first longitudinal end 106a along the first longitudinal direction $L_1$. The first conveyor segment 106 is elongate from the first longitudinal end 106a to the second longitudinal end 106b. The first conveyor segment 106 has a first lateral side 106c and a second lateral side 106d spaced from the first lateral side 106c along the first lateral direction $A_1$, perpendicular to the first longitudinal direction $L_1$. The first conveyor segment 106 further has at least a one conveyor surface 106e (herein referred to as a first conveyor surface) that extends between the first and second longitudinal ends 106a and 106b and between the first and second lateral sides 106c and 106d.

The first conveyor segment 106 is configured to translate inventory carriers 300 along the first conveyor surface 106e from the first longitudinal end 106a to the second longitudinal end 106b along the first longitudinal direction $L_1$ when the conveyor segments operate in a counterclockwise direction as viewed looking in the first lateral direction $A_1$. Additionally or alternatively, the first conveyor segment 106 is configured to translate inventory carriers 300 along the conveyor surface 106e from the second end 106b to the first end 106a along a second longitudinal direction $L_2$, opposite the first longitudinal direction $L_1$, when the conveyor segments operate in a clockwise direction as viewed looking in the first lateral direction $A_1$.

Similarly, the second conveyor segment 108 has a first longitudinal end 108a, and a second longitudinal end 108b that is offset from the first longitudinal end 108a along the first longitudinal direction $L_1$. The second conveyor segment 108 is elongate from the first longitudinal end 108a to the second longitudinal end 108b. The second conveyor segment 108 has a first lateral side 108c and a second lateral side 108d spaced from the first lateral side 108c along the first lateral direction $A_1$. The second conveyor segment 108 further has at least one conveyor surface 108e (herein referred to as a second conveyor surface) that extends between the first and second longitudinal ends 108a and 108b and between the first and second lateral sides 108c and 108d.

The second conveyor segment 108 is configured translate inventory carriers 300 along the second conveyor surface 108e from the second end 108b to the first end 108a along the second longitudinal direction $L_2$ when the conveyor segments operate in a counterclockwise direction as viewed looking in the first lateral direction $A_1$. Additionally or alternatively, the second conveyor segment 108 is configured to translate inventory carriers 300 along the second conveyor surface 108e from the first end 108a to the second end 108b along the first longitudinal direction $L_1$ when the conveyor segments operate in a clockwise direction as viewed looking in the first lateral direction $A_1$. The second conveyor segment 108 is offset from the first conveyor segment 106 along the vertical direction V.

The first vertical lift 200(1) is configured to transfer inventory carriers 300 between the first end 106a of the first conveyor segment 106 and the first end 108a of the second conveyor segment 108. For instance, the first vertical lift 200(1) transfers inventory carriers 300 from the first end 106a of the first conveyor segment 106 to the first end 108a of the second conveyor segment 108 when the storage module 100 operates in the clockwise direction, and from the first end 108a of the second conveyor segment 108 to the first end 106a of the first conveyor segment 106 when the storage module 100 operates in the counterclockwise direction. Similarly, the second vertical lift 200(2) is configured to transfer inventory carriers 300 between the second end 106b of the first conveyor segment 106 and the second end 108b of the second conveyor segment 108. For instance, the second vertical lift 200(2) transfers inventory carriers 300 from the second end 106b of the first conveyor segment 106 to the second end 108b of the second conveyor segment 108 when the storage module 100 operates in the counterclockwise direction, and from the second end 108b of the second conveyor segment 108 to the second end 106b of the first conveyor segment 106 when the storage module 100 operates in the clockwise direction.

Figures 3, 4:
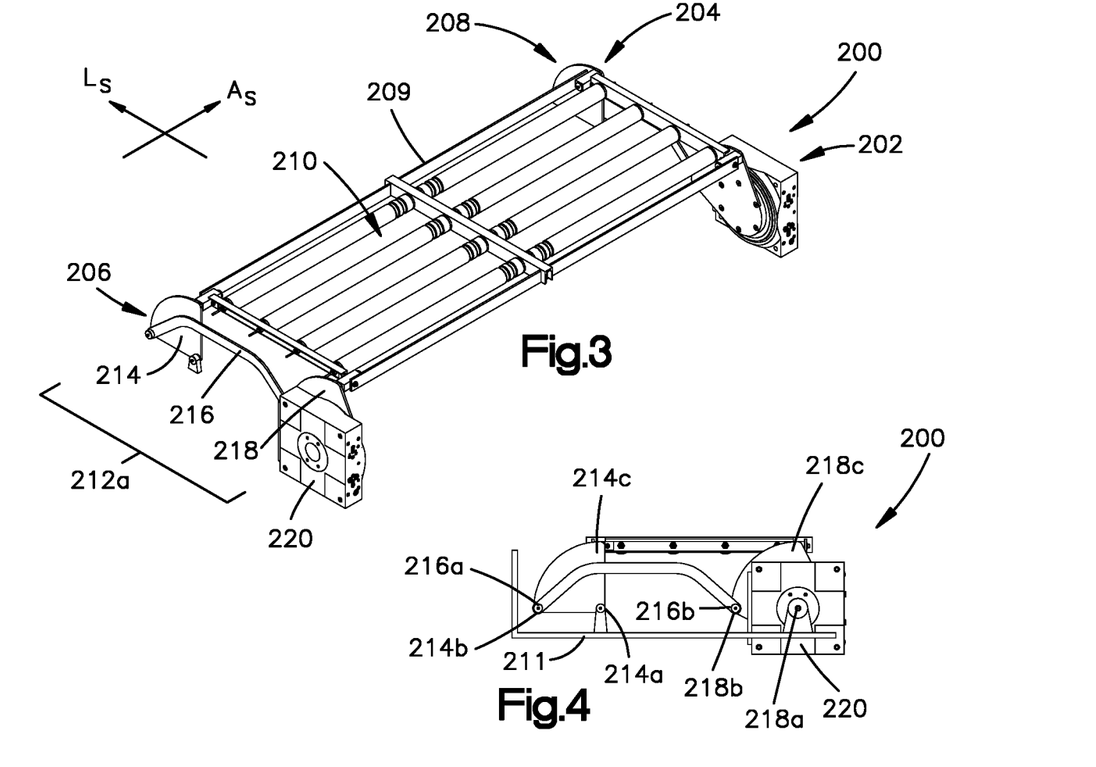
FIG. 3 shows a perspective top view of a vertical lift of the storage module of FIG. 1 in a raised position.
FIG. 4 shows a side elevation view of the vertical lift of FIG. 3.
Figure 5:
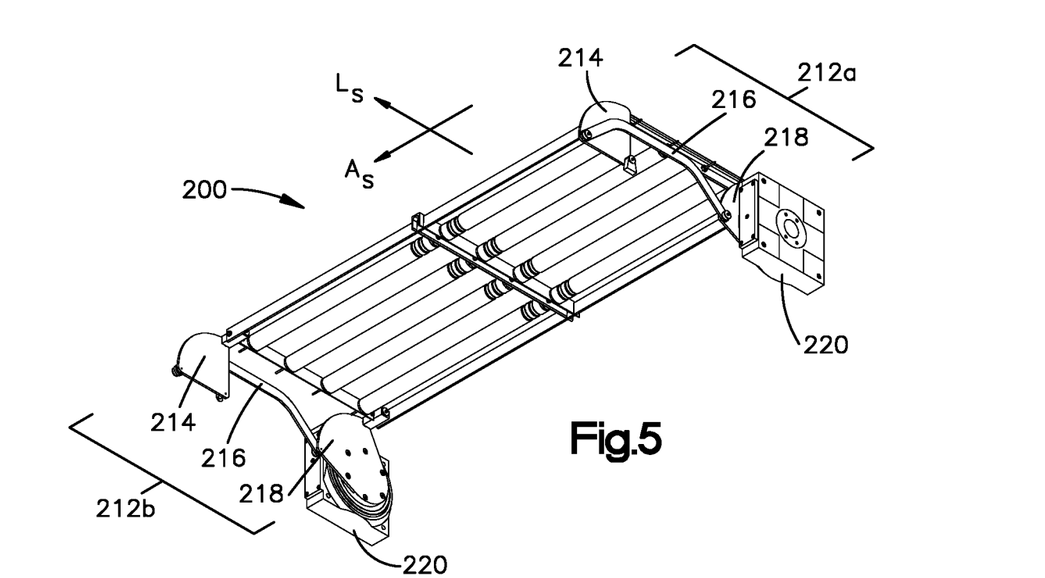
FIG. 5 shows a bottom perspective view of the vertical lift of FIG. 3.

Turning now to FIGS. 3 to 5, a vertical lift 200 is shown according to one embodiment. One or both of the first and second vertical lifts 200(1) and 200(2) in FIG. 1 can be implemented in the manner shown in FIGS. 3 to 5. It will be understood that, in alternative embodiments, one or both of the first and second vertical lifts 200(1) and 200(2) can be implemented in a manner different from that shown in FIGS. 3 to 5. The vertical lift 200 has a first or outer longitudinal end 202, and a second or inner longitudinal end 204 that is offset from the first longitudinal end 202 along a select longitudinal direction $L_S$. The vertical lift 200 has a first lateral side 206, and a second lateral side 208 that is offset from the first lateral side 206 along a select lateral direction $A_S$. The vertical lift 200 further has a lift conveyor segment 209 that includes a conveyor surface 210 that extends between the first and second longitudinal ends 202 and 204 and between the first and second lateral sides 206 and 208. When implementing the first vertical lift 200(1), the select longitudinal direction $L_S$ can be the first longitudinal direction $L_1$ and the select lateral direction $A_S$ can be the first lateral direction $A_1$. When implementing the second vertical lift 200(2), the select longitudinal direction $L_S$ can be the second longitudinal direction $L_2$ and the select lateral direction $A_S$ can be the second lateral direction $A_2$.

The vertical lift 200 can comprise at least one linkage that is configured to raise and lower the conveyor segment 209 along the vertical direction V. The at least one linkage can include a plurality of links that are interconnected with one another. Further, each linkage can be driven by an actuator that moves the links relative to one another so as to raise and lower the conveyor segment 209. For example, the vertical lift 200 can include a first linkage 212a and a second linkage 212b that is offset from the first linkage along the select lateral direction $A_S$. Each linkage can include a support 211, such as a bracket, that attaches the linkage to at least one of the first and second conveyor segments 106 and 108. Each linkage can include a first link 214 and a second link 218 offset from one another along the select longitudinal direction $L_S$. The first link 214, the second link 218, the support 211, and the conveyor segment 209 together can define a four-bar linkage as will be discussed in further detail below. Each linkage can also include a third link 216. The third link 216 can define a fifth bar, which is in addition to the four bars of the four-bar linkage. The third link 216 can be configured to prevent the first and second links 214 and 218 from rotating in opposite directions, thereby maintaining the conveyor segment 209 in a horizontal or upright position. The vertical lift 200 can also include, for each linkage, an actuator 220 configured to move the second link 218, which in turn can move the conveyor segment 209 and the third link 216, which can in turn move the first link 214. The actuator 220 can be a rotary actuator, such as a pneumatic rotary actuator made by Festo, or any other suitable actuator.

The first and second links 214 and 218 can each be pivotally connected to the conveyor segment 209, and the third link 216 can be pivotally connected to the both the first and second links 214 and 218. The first link 214 can define three pivot points 214a, 214b, and 214c. The three pivot points 214a, 214b, and 214c can define the vertices of a triangle. The triangle can be a right triangle as shown or other suitable triangle, the leg length and angles of which can be chosen according to the desired movement of the conveyor surface 210. The first pivot point 214a can define the vertex opposite the hypotenuse of the triangle, and can be fixed relative to the first and second conveyor segments 206 and 208. The second pivot point 214b can be pivotally coupled to a first end 216a of the third link 216. The third pivot point 214c can be pivotally coupled to the conveying segment 209 at the inner longitudinal end 204 of the vertical lift 200. The third link 216 can be a bar having a first end that defines a first pivot point 216a and a second end that defines a second pivot point 216b. The first pivot point 216a can be pivotally coupled to the second pivot point 214b of the first link 214. The second pivot point 216b can be pivotally coupled to the second link 218.

The second link 218 can define three pivot points 218a, 218b, and 218c. The three pivot points 218a, 218b, and 218c can define the vertices of a triangle. The triangle can be any suitable triangle, the length and angles of which can be chosen according to the desired movement of the conveyor surface 210. The first pivot point 218a can be pivotally coupled to the actuator 220. The second pivot point 218b can be pivotally coupled to the second end 216b of the third link 216. The third pivot point 214c can be pivotally coupled to conveyor segment 209 at the outer longitudinal end 202 of the vertical lift 200. The support 211 can be positionally and rotationally fixed relative to the first and second conveyor segments 106 and 108. The support can be coupled to the first link 214 at the first pivot point 214a of the first link 214, and to the second link 218 at the first pivot point 218a of the second link 218.

Each actuator 220 can be configured to rotate a corresponding second link 218 back and forth. For example, each actuator can be configure to rotate a corresponding second link 218 in a clockwise direction as viewed in the select lateral direction $A_S$ so as to raise the conveyor segment 209, and in a counterclockwise direction as viewed in the select lateral direction $A_S$ so as to lower the conveyor segment 209. Each actuator 220 can rotate about less than 360 degrees. For example, each actuator 220 can rotate in the clockwise direction from, for example, a six o'clock position to a three o'clock position to a 12 o'clock position. Additionally, each actuator 220 can rotate in the counterclockwise direction from, for example, the 12 o'clock position to the three o'clock position to the six o'clock position. The conveyor surface 210 remains horizontal throughout the rotation.

Each linkage 212a and 212b can be configured such that rotation of its second link 218 in a clockwise direction causes its conveyor segment 209 to raise, which in turn causes its first link 214 to rotate in a clockwise direction. Further, each linkage 212a and 212b can be configured such that rotation of its second link 218 in a counterclockwise direction causes its conveyor segment 209 to lower, which in turn causes its first link 214 to rotate in a counterclockwise direction. The third link 216 can be employed to ensure that the first link 214 rotates in the same direction as the second link 214 so as to maintain the conveyor surface 210 in a horizontal orientation. Thus, the third link 216 can ensure that the first link 214 rotates in a clockwise direction when the second link 218 rotates in a clockwise direction, and that the first link 214 rotates in a counterclockwise direction when the second link 218 rotates in a counterclockwise direction.

The first link 214, the second link 218, the support 211, and the conveyor segment 209 together can define a standard four-bar linkage. In particular, the first link 214 can define a first bar of the four-bar linkage, where the first bar extends from the first pivot point 214a to the third pivot point 214c of the first link 214. The second link 218 can define a second bar of the four-bar linkage, where the second bar extends from the first pivot point 218a to the third pivot point 218c of the second link 218. In one example, the first bar can have a length from the first pivot point 214a to the third pivot point 214c that is equal to a length of the second bar from the first pivot point 218a to the third pivot point 218c. The conveyor segment 209 can define a third bar of the four-bar linkage from the third pivot point 214c of the first link 214 to the third pivot point 218c of the second link 218. The support 211 can define a fourth bar of the four-bar linkage from the first pivot point 214a of the first link 214 to the first pivot point 218a of the second link 218. In one example, the third bar can have a length from the third pivot point 214c to the third pivot point 218c that is equal to a length of the fourth bar from the first pivot point 214a to the first pivot point 218a. The conveyor segment 209 is configured such that inventory carriers 300 can be translated along the conveyor surface 210 along the select longitudinal direction $L_S$ so as to move the inventory carriers 300 from the conveyor surface 210 to one of the first and second conveyor segments 106 and 108. Further, the conveyor segment 209 is configured such that inventory carriers can be translated along the conveyor surface 210 along a direction that is opposite the select longitudinal direction $L_S$ so as to move the inventory carriers 300 from one of the first and second conveyor segments 106 and 108 onto the conveyor surface 210.

Figure 13:
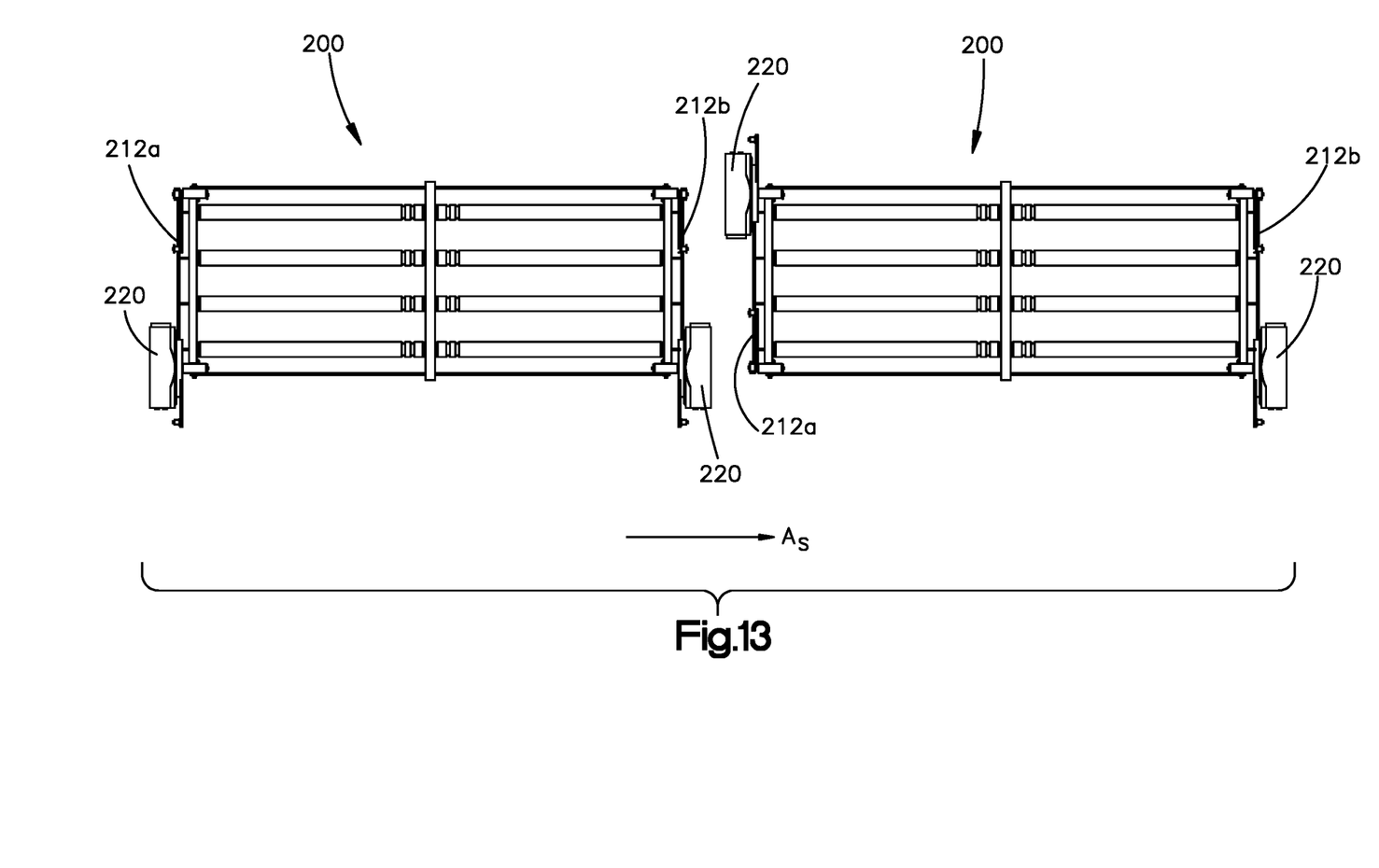
FIG. 13 shows a top view of two vertical lifts according to one embodiment.

Referring to FIG. 13, as described above, the vertical lift 200 can include a first linkage 212a and a second linkage 212b. The second linkage 212b can be implemented as a substantial mirror image of the first linkage 212a as shown in the vertical lift on the left-hand side. Thus, the actuators 220 of the first linkage 212a and the second linkage 212b can be aligned with one another along the select lateral direction $A_S$. Alternatively, as shown in the vertical lift on the right-hand side, the second linkage 212b can be a substantial copy of the first linkage 212a, rotated 180 degrees. Thus, the actuators 220 of the first linkage 212a and the second linkage 212b can be staggered such that they are not aligned with one another along the select lateral direction $A_S$. Staggering the actuators 220 in such a manner can permit a vertical lift (e.g., the vertical lift on the right-hand side) of a first storage module to be nested with a vertical lift (e.g., the vertical lift on the left-hand side) of an adjacent storage module so that the adjacent storage modules can be spaced closer to one another.

In general, conveyor segments of the present disclosure can be implemented using any suitable type of conveyor technology or any combination of suitable technologies. For example, each conveyor segment of the present disclosure can include at least one sliding surface (not shown), at least one rotating conveyor element, or any combination thereof, where each sliding surface or rotating conveyor element at least partially defines the conveyor surface of the conveyor segment. The at least one rotating conveyor element can include at least one powered rotating conveyor element that is configured to rotate in a direction that drives the inventory carriers 300 to translate along a respective one of the conveyor surfaces.

For example, the at least one powered rotating conveyor element can include (without limitation) (i) a motor-driven roller that is driven by a motor that is disposed within the roller such as those made by Interroll, (ii) a chain- or belt-driven roller that is driven by a chain or belt that is in turn driven by a motor that is external to the roller, (iii) a conveyor belt or wire-mesh belt, (iv) any other suitable powered rotating conveyor element, or (v) any combination thereof. The at least one powered rotating conveyor element can extend across only a portion of a conveyor segment such as (without limitation) adjacent an end of the conveyor segment, or can extend across an entire length of a conveyor segment. For example, a conveyor belt or wire-mesh belt can extend adjacent an end of the conveyor segment or can extend across an entire length of a conveyor segment. Similarly, one or more rollers can be disposed adjacent one end of the conveyor segment, or a plurality of rollers can be disposed across an entire length of the conveyor segment.

Additionally or alternatively, the at least one rotating conveyor element can include at least one unpowered rotating conveyor element that rotates in response to an item being translated thereon. The at least one unpowered rotating conveyor element can include (i) a ball, (ii) a roller, (iii) a skate wheel, (iv) any other suitable rotating conveyor element that is configured to roll in response to an inventory carrier being translated thereon, or (v) any combination thereof. The at least one powered rotating conveyor element can extend across only a portion of a conveyor segment such as (without limitation) adjacent a middle portion of the conveyor segment, or can extend across an entire length of a conveyor segment. In some embodiments, the storage module can include at least one actuator in addition to, or alternatively to, at least one powered rotating conveyor elements. Each actuator can be configured to push the inventory carriers along a conveyor surface, and may be used in combination with or in lieu of at least one powered rotating conveyor elements to drive the inventory carriers along the conveyor surface.

Referring now more specifically to the embodiment of FIG. 1, the first conveyor segment 106 can include a plurality of rotating conveyor elements that define the first conveyor surface 106e. For example, the first conveyor segment 106 can include a plurality of rollers, each having a central axis that extends along the first lateral direction $A_1$. The plurality of rollers can include a first powered roller 114 adjacent the first end 106a and a second powered roller 116 adjacent the second end 106b. The first and second powered rollers 114 and 116 can assist in driving inventory carriers 300 onto the vertical lifts 200(1) and 200(2). The plurality of rotating conveyor segments can further include at least one unpowered rotating conveyor element 118 between the first and second powered rollers 114 and 116. The at least one unpowered rotating conveyor element 118 can include a plurality of unpowered rollers as shown. It will be understood that, in alternative embodiments, the conveyor surface 106e of the first conveyor segment 106 can be implemented using any suitable type of conveyor technology or any combination of suitable technologies as described above. For example, the conveyor surface 106e can be implemented entirely by unpowered rotating conveyor elements, and the inventory carriers 300 can be driven along the conveyor surface 106e by at least one linear actuator that pushes the inventory carriers 300 along the conveyor surface 106e.

The second conveyor segment 108 can be implemented in a manner that is substantially similar to that of the first conveyor segment 106, although the second conveyor segment 108 is configured to translate items in a direction opposite from that of the first conveyor segment 106. The second conveyor segment 108 can include a plurality of rotating conveyor elements that define the first conveyor surface 108e. For example, the second conveyor segment 108 can include a plurality of rollers, each having a central axis that extends along the first lateral direction $A_1$. The plurality of rollers can include a first powered roller 120 adjacent the first end 108a and a second powered roller 122 adjacent the second end 108b. The first and second powered rollers 120 and 122 can assist in driving inventory carriers 300 onto the vertical lifts 200(1) and 200(2). The second conveyor segment 108 can further include at least one unpowered rotating conveyor element 124 between the first and second powered rollers 120 and 122. The at least one unpowered rotating conveyor element 124 can includes a plurality of unpowered rollers as shown. It will be understood that, in alternative embodiments, the conveyor surface 108e of the second conveyor segment 108 can be implemented using any suitable type of conveyor technology or any combination of suitable technologies as described above. For example, the conveyor surface 108e can be implemented entirely by unpowered rotating conveyor elements, and the inventory carriers 300 can be driven along the conveyor surface 108e by at least one linear actuator that pushes the inventory carriers 300 along the conveyor surface 108e.

The first vertical lift 200(1) can include a third conveyor segment 209(1). The first vertical lift 200(1) can be configured to move between a raised position, wherein the third conveyor 209(1) segment is vertically aligned with the first conveyor segment 106, and a lowered position, wherein the third conveyor segment 209(1) is vertically aligned with the second conveyor segment 108. The third conveyor segment 209(1) includes plurality of rotating conveyor elements that define a conveyor surface 210(1) (herein referred to as a third conveyor surface) of the first vertical lift 200(1). For example, the first vertical lift 200(1) can include a plurality of rollers, each having a central axis that extends along the first lateral direction $A_1$. The plurality of rollers can include at least one powered roller 126 that is configured to assist in driving inventory carriers 300 onto the first vertical lift 200(1). It will be understood that, in alternative embodiments, the third conveyor surface 210(1) of the first vertical lift 200(1) can be implemented using any suitable type of conveyor technology or any combination of suitable technologies as described above. For example, the third conveyor surface 210(1) can be implemented entirely by unpowered rotating conveyor elements, and the inventory carriers 300 can be driven onto and off of the third conveyor surface 210(1) by at least one linear actuator that pushes the inventory carriers 300 onto or off of the third conveyor surface 210(1).

The second vertical lift 200(2) can include a fourth conveyor segment 209(2). The second vertical lift 200(2) can be configured to move between a raised position, wherein the fourth conveyor segment 209(2) is vertically aligned with the first conveyor segment 106, and a lowered position, wherein the fourth conveyor segment 209(2) is vertically aligned with the second conveyor segment 108. The fourth conveyor segment 209(2) can include a plurality of rotating conveyor elements that define a conveyor surface 210(2) (herein referred to as the fourth conveyor surface) of the second vertical lift 200(2). For example, the second vertical lift 200(2) can include a plurality of rollers, each having a central axis that extends along the first lateral direction $A_1$. The plurality of rollers can include at least one powered roller 128 that is configured to assist in driving inventory carriers 300 onto the vertical lift 200(2). It will be understood that, in alternative embodiments, the fourth conveyor surface 210(2) of the vertical lift 200(2) can be implemented using any suitable type of conveyor technology or any combination of suitable technologies as described above. For example, the fourth conveyor surface 210(2) can be implemented entirely by unpowered rotating conveyor elements, and the inventory carriers 300 can be driven onto and off of the fourth conveyor surface 210(2) by at least one linear actuator that pushes the inventory carriers 300 onto or off of the fourth conveyor surface 210(2).

Figure 2:
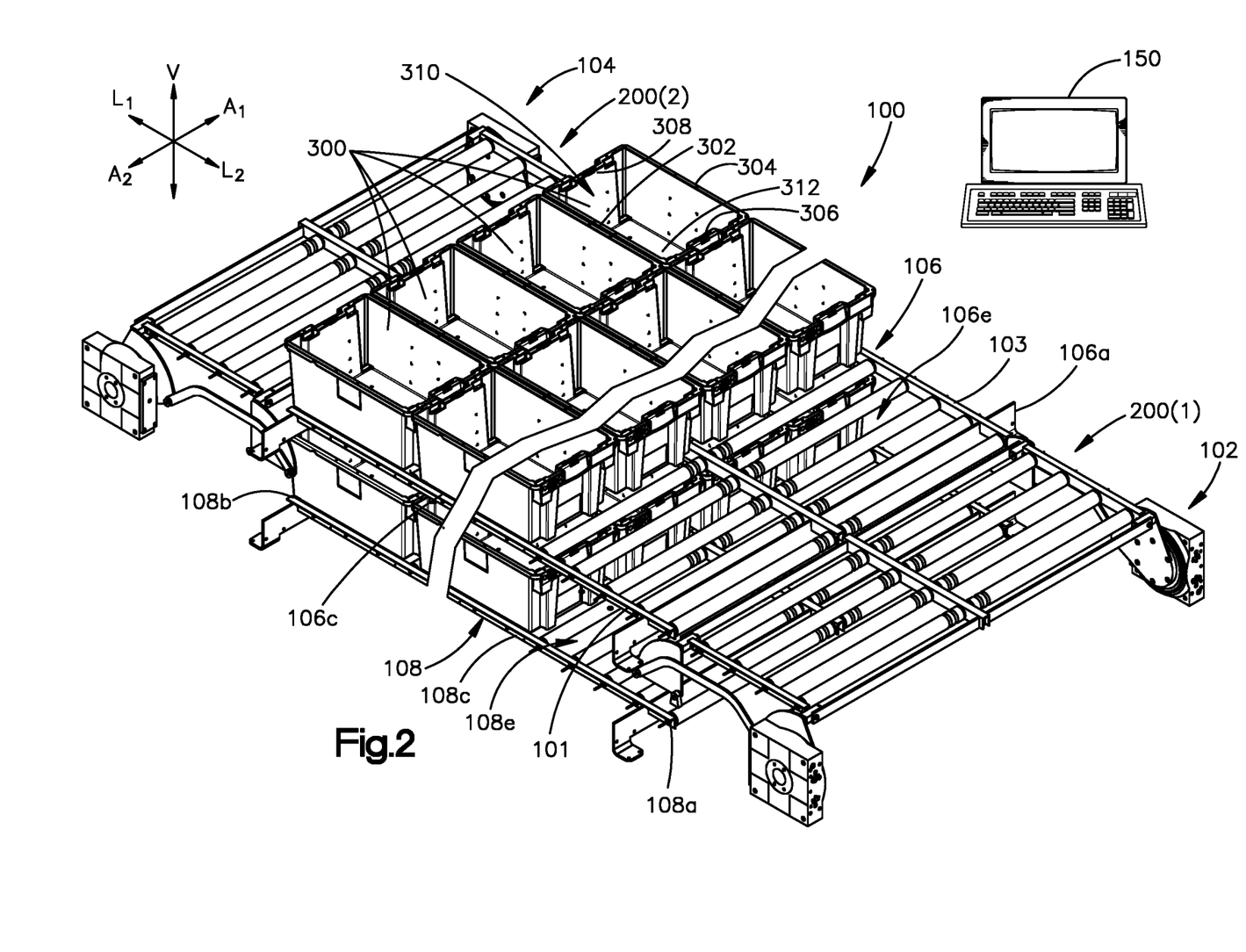
FIG. 2 shows a perspective view of a system comprising the storage module of FIG. 1 and a plurality of inventory carriers supported by the storage module.

Turning now to FIG. 2, a system is shown comprising a storage module 100 and a plurality of inventory carriers 300. Each inventory carrier 300 can be any suitable storage container configured to be supported by the storage module 100 and to hold items. For example, each inventory carrier 300 can be a rectangular structure, such as a bin or tote, formed from a rigid material such as plastic, wood, aluminum, or other suitable material. Each inventory carrier 300 can have a first sidewall 302, and a second sidewall 304 that is spaced from third first sidewall 302 along the first lateral direction $A_1$. Each storage container can have a first end wall 306, and a second end wall 308 that is spaced from the first end wall 306 along the first longitudinal direction $L_1$. Each inventory carrier 300 can further an upper end 310 and a bottom surface 312 spaced from one another along a vertical direction V. The bottom surface 312 can extend between the opposed sidewalls 302 and 304 and between the opposed end walls 306 and 308. The upper end 310 can be open for ease of access in placing inventory items into, and retrieving inventory items from, the storage container 300. Each inventory carrier 300 can have an overall carrier width $W_S$ along the first lateral direction $A_1$, an overall carrier height $H_S$ along the vertical direction V, and an overall carrier length $L_s$ along the first longitudinal direction $L_1$. In some embodiments, the overall length $L_s$ can be greater than at least one of the overall width $W_S$ and the overall height $H_S$. In other embodiments, the inventory carriers 300 can be alternatively sized. For example, in some other embodiments, the overall width $W_S$ can be greater than at least one of the overall length $L_S$ and the overall height $H_S$.

The inventory carriers 300 can be densely packed along the first and second conveyor segments 106 and 108. For example, the inventory carriers 300 carried by the first conveyor segment 106 can be arranged end-to-end such that there is little to no space between adjacent ones of the inventory carriers 300. Similarly, the inventory carriers 300 carried by the second conveyor segment 108 can be arranged end-to-end such that there is little to no space between adjacent ones of the inventory carriers 300. In some embodiments, inventory carriers 300 along each conveyor segment may contact one another other. In other embodiments, inventory carriers 300 may be spaced from each other by a distance that is no more than 10 percent of the overall length $L_S$ of each inventory carrier 300 along the conveyor segment or no more than 5 percent of the overall length $L_S$ of each inventory carrier 300 along the conveyor segment. In some embodiments, the storage module 100 can be configured such that each of at least one of the inventory carriers 300 may have one or more inventory carrier 300 stacked on top of the inventory carrier 300. Stacking the inventory carriers 300 on top of one another can increase the storage density of the storage module 100 over that of storage modules in which the inventory carriers are not stacked.

The inventory carriers 300 can also be densely packed along the vertical direction. In particular, the first conveyor segment 106 can be stacked above the inventory carriers 300 on the second conveyor segment 108 (or the bottom level) so that the space between each inventory carrier 300 on the bottom level and the first conveyor segment 106 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the inventory carriers, such as a spacing that is no more than 20 percent of the height of the inventory carrier, such as no more than 15 percent of the height of the inventory carrier, such as no more than 10 percent of the height of the inventory carrier, or such as no more than 5 percent of the height of the inventory carrier. Storage density is inversely proportional to the distance between an inventory carrier and the conveyor segment 106 immediate over top of the inventory carrier 300. Thus, as this distance is decreased, the storage density increases.

The storage module 100 can have an overall module width $W_M$ along the first lateral direction $A_1$ from the first side 101 to the second side 103. The overall module width $W_M$ can be greater than or equal to the carrier width $W_S$ such that the storage module 100 is configured to support at least one inventory carrier 300 from the first side 101 to the second side 103. As shown in FIG. 2, in some embodiments, the storage module 100 can have an overall module width $W_M$ that is greater than the carrier width $W_S$ such that the storage module 100 is configured to support a plurality of inventory carriers 300 side-by-side between the first side 101 and the second side 103. In such embodiments, the inventory carriers 300 can be densely packed from the first side 101 to the second side 103. For example, the inventory carriers 300 carried by the first conveyor segment 106 can be arranged side-to-side such that there is little to no space between adjacent ones of the inventory carriers 300. Similarly, the inventory carriers 300 carried by the second conveyor segment 108 can be arranged side-to-side such that there is little to no space between adjacent ones of the inventory carriers 300. In some embodiments, the inventory carriers 300 that are arranged side-to-side may contact one another other. In other embodiments, the inventory carriers 300 that are arranged side-to-side may be spaced from each other by a distance that is no more than 10 percent of the overall width $W_S$ of each inventory carrier 300 or no more than 5 percent of the overall width $W_S$ of each inventory carrier 300.

Referring now to FIGS. 6 to 11, one method of translating the inventory carriers 300 around a vertical conveying loop of the storage module 100 in a clockwise direction will now be described. In this method, one vertical lift 200(1) or 200(2) transitions inventory carriers 300 between the first and second conveyor segments 106 and 108 of the module 100 at a time. However, it will be understood that, in alternative methods, both vertical lifts 200(1) and 200(2) could transition inventory carriers 300 between the first and second conveyor segments 106 and 108 concurrently. As the inventory carriers 300 are translated around the vertical conveying loop, the orientation of each carrier 300 remains fixed. Thus, the second end wall 308 of each carrier 300 remains spaced from the first end wall 306 of the carrier 300 along the first longitudinal direction $L_1$ as the carrier 300 is translated around the conveying loop. Similarly, the upper end 310 remains spaced above the bottom surface 312 as the carrier 300 is translated around the conveying loop. It will be understood that the carriers 300 can additionally or alternatively be translated in a counterclockwise direction.

Figure 6:
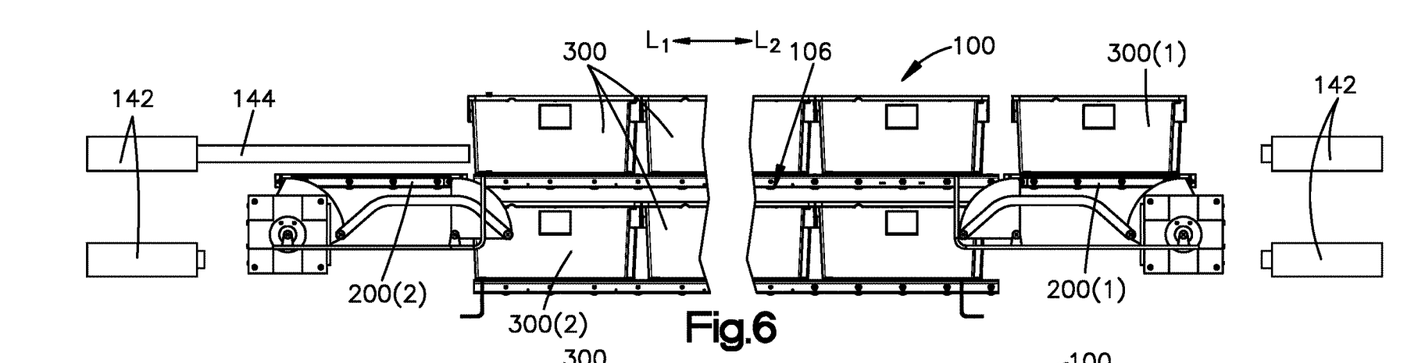
FIG. 6 shows a side view of the storage module of FIG. 1 with each of the vertical lifts in a raised position and the inventory carriers in a first rotational position.

In FIG. 6, a step is shown that comprises causing the inventory carriers 300 to be translated along the upper level of the storage module 100 along the second longitudinal direction $L_2$. This step can include causing a first inventory carrier 300(1) to be translated from the first conveyor segment 106 onto the first vertical lift 200(1) along the second longitudinal direction $L_2$, where the first vertical lift 200(1) is shown in a raised position. The storage module 100 can include an actuator 142 that is configured to push the inventory carriers 300 along the second longitudinal direction $L_2$ until the first inventory carrier 300(1) is at least partially disposed on the first vertical lift 200(1). In one example, the actuator 142 can be a linear actuator having a shaft 144 that extends in the second longitudinal direction $L_2$ so as to engage and drive the inventory carriers 300 in the second longitudinal direction $L_2$, although it will be understood that alternative linear actuators may be used. The first conveyor segment 106 can be devoid of powered rotating conveyor elements, and the inventory carriers can be driven along the second longitudinal direction $L_2$ entirely by the actuator or other mechanism.

In alternative embodiments, the storage module 100 can include at least one powered rotating conveyor element (discussed above) that drives the inventory carriers 300 in the second longitudinal direction $L_2$ until the first inventory carrier 300(1) is at least partially disposed on the first conveyor segment 106. The at least one powered rotating conveyor element can assist an actuator in pushing the inventory carriers 300. Alternatively, the at least one powered rotating conveyor element can drive each of the inventory carriers without needing the inventory carriers to push one another and/or without needing an actuator to push the carriers. The unpowered rotating conveyor elements 118 (if any) of the first conveyor segment 106 are configured to spin in response to the inventory carriers 300 being translated thereon so as to limit the amount of force that is needed to push the inventory carriers 300.

Figure 7:
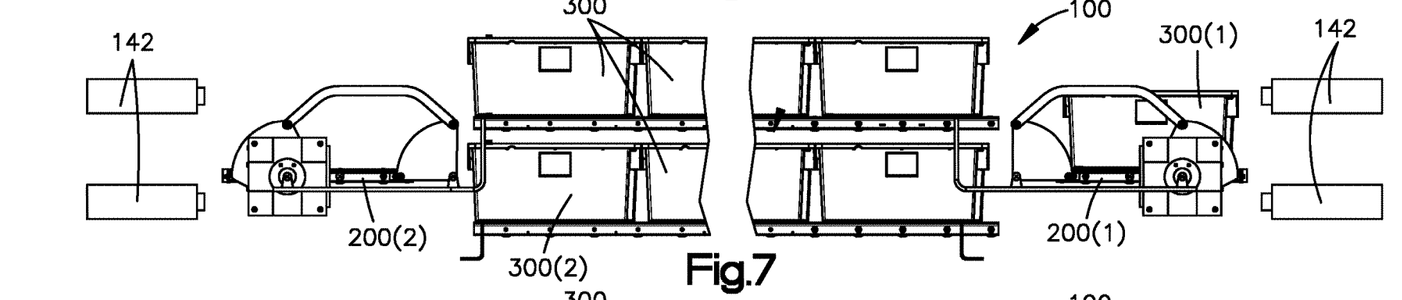
FIG. 7 shows a side view of the storage module of FIG. 1 with each of the vertical lifts in an intermediate position and the inventory carriers in a second rotational position.
Figure 8:
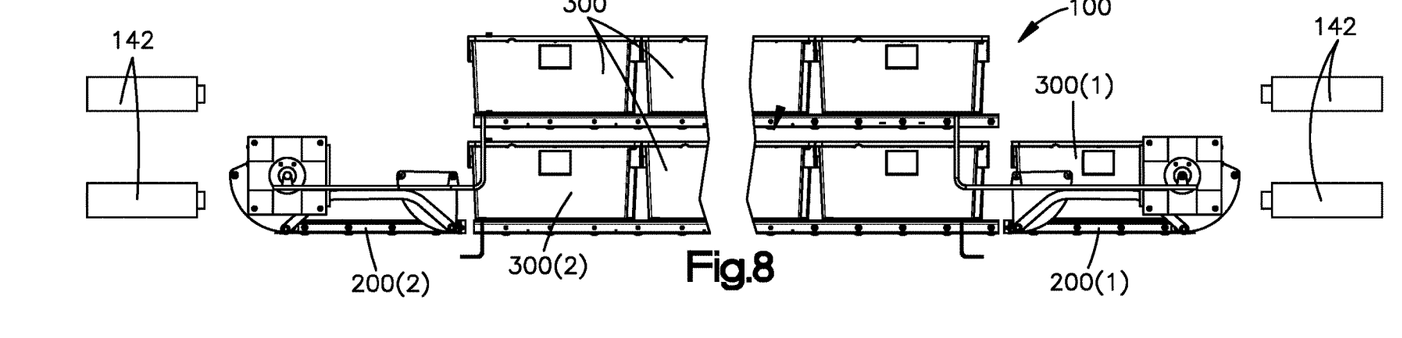
FIG. 8 shows a side view of the storage module of FIG. 1 with each of the vertical lifts in a lowered position and the inventory carriers in a third rotational position.

In FIG. 7, a step is shown that comprises causing the first vertical lift 200(1) (and optionally the second vertical lift 200(2)) to be transitioned from the raised position in FIG. 6 to an intermediate position, and in FIG. 8, a step is shown that comprises causing the first vertical lift 200(1) (and optionally the second vertical lift 200(2)) to be transitioned from the intermediate position to a lowered position. In the intermediate position, an inventory item can be retrieved from, or stowed into, the first inventory carrier 300(1), or the first inventory carrier 300(1) can be removed from the storage module 100 so that an inventory item can be retrieved from, or stowed into, the first inventory carrier 300(1). However, it will be understood that, in alternative embodiments, this stowing and retrieving can be performed in in any one or more of the raised position in FIG. 6, the intermediate position in FIG. 7, and the lowered position in FIG. 8.

Figure 9:
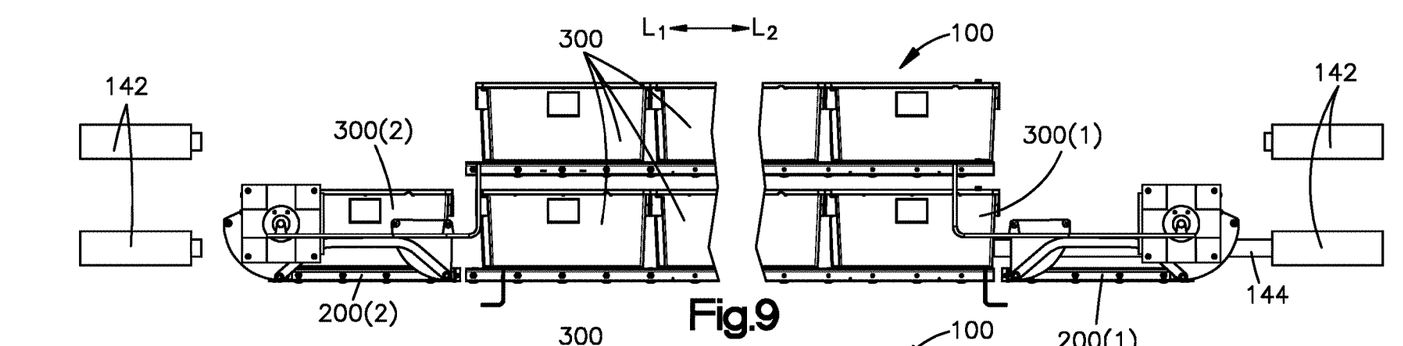
FIG. 9 shows a side view of the storage module of FIG. 1 with each of the vertical lifts in a lowered position and the inventory carriers in a fourth rotational position.

In FIG. 9, a step is shown that comprises causing the inventory carriers 300 to be translated along the lower level of the storage module 100 along the first longitudinal direction $L_1$. This step can include causing a second inventory carrier 300(2) to be translated from the second conveyor segment 108 onto the second vertical lift 200(2) along the first longitudinal direction $L_1$, where the second vertical lift 200(2) is shown in the lowered position. The storage module 100 can include an actuator 142 that is configured to push the inventory carriers 300 along the first longitudinal direction $L_1$ until the second inventory carrier 300(2) is at least partially disposed on the second vertical lift 200(2). In one example, the actuator 142 can be a linear actuator having a shaft 144 that extends in the first longitudinal direction $L_1$ so as to engage and drive the inventory carriers 300 in the first longitudinal direction $L_1$, although it will be understood that alternative linear actuators may be used. The second conveyor segment 108 can be devoid of powered rotating conveyor elements, and the inventory carriers can be driven along the second longitudinal direction $L_2$ entirely by the actuator or other mechanism.

In alternative embodiments, the storage module 100 can include at least one powered rotating conveyor element (discussed above) that drives the inventory carriers 300 in the first longitudinal direction $L_1$ until the second inventory carrier 300(2) is at least partially disposed on the second vertical lift 200(2). The at least one powered rotating conveyor element can assist an actuator in pushing the inventory carriers 300. Alternatively, the at least one powered rotating conveyor element can drive each of the inventory carriers without needing the inventory carriers to push one another and/or without needing an actuator to push the carriers. The unpowered rotating conveyor elements 124 (if any) of the second conveyor segment 108 are configured to spin in response to the inventory carriers 300 being translated thereon so as to limit the amount of force that is needed to push the inventory carriers 300.

Figures 10, 11:
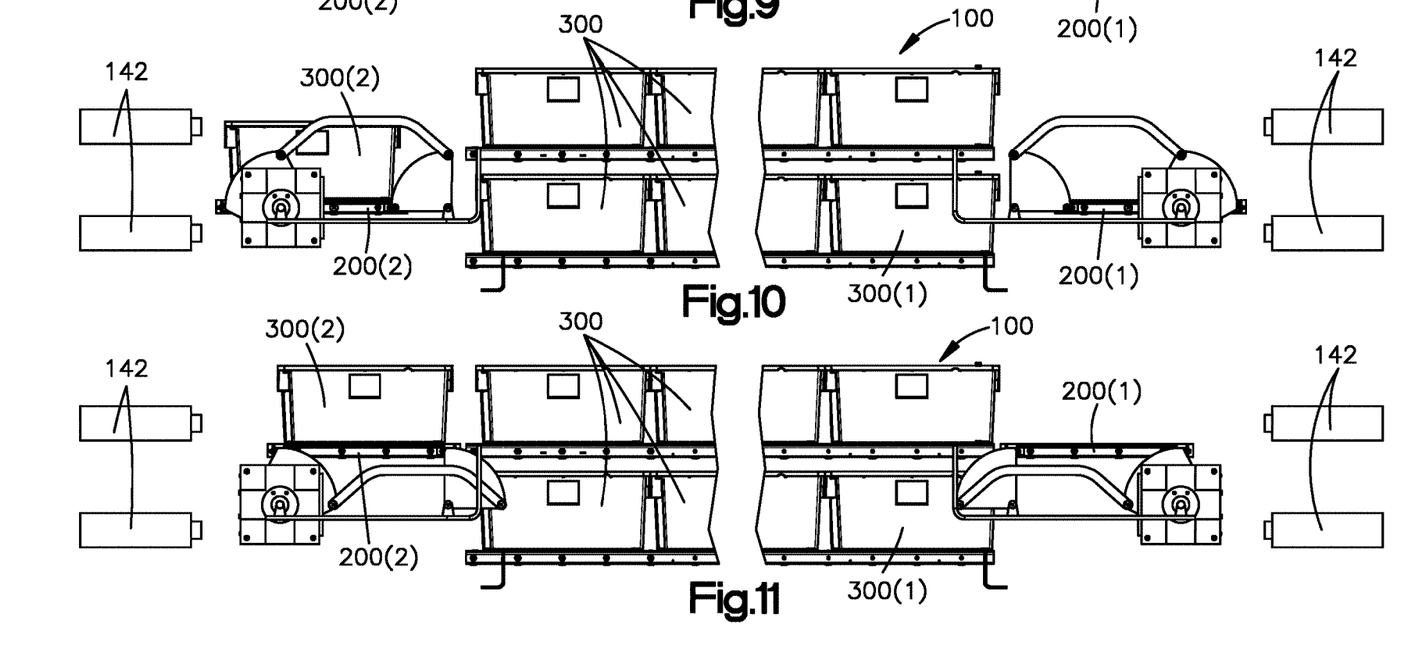
FIG. 10 shows a side view of the storage module of FIG. 1 with each of the vertical lifts in an intermediate position and the inventory carriers in a fifth rotational position.
FIG. 11 shows a side view of the storage module of FIG. 1 with each of the vertical lifts in a raised position and the inventory carriers in a sixth rotational position.

In FIG. 10, a step is shown that comprises causing the second vertical lift 200(2) (and optionally the first vertical lift 200(1)) to be transitioned from the lowered position in FIG. 9 to an intermediate position, and in FIG. 11, a step is shown that comprises causing the second vertical lift 200(2) (and optionally the first vertical lift 200(1)) to be transitioned from the intermediate position to a raised position. In the intermediate position, an inventory item can be retrieved from, or stowed into, the second inventory carrier 300(2), or the second inventory carrier 300(2) can be removed from the storage module 100 so that an inventory item can be retrieved from, or stowed into, the second inventory carrier 300(2). However, it will be understood that, in alternative embodiments, this stowing and retrieving can be performed in in any one or more of the raised position in FIG. 9, the intermediate position in FIG. 10, and the lowered position in FIG. 11. It will be understood that method of FIGS. 6 to 11 can begin at any one of the steps of FIGS. 6 to 11, depending on the positions of the storage carriers 300. Further, at least one, up to all, of the steps in FIGS. 6 to 11 can be repeated as desired to present a desired one of the storage containers 300 at one of the first and second ends 102 and 104.

Figure 12:
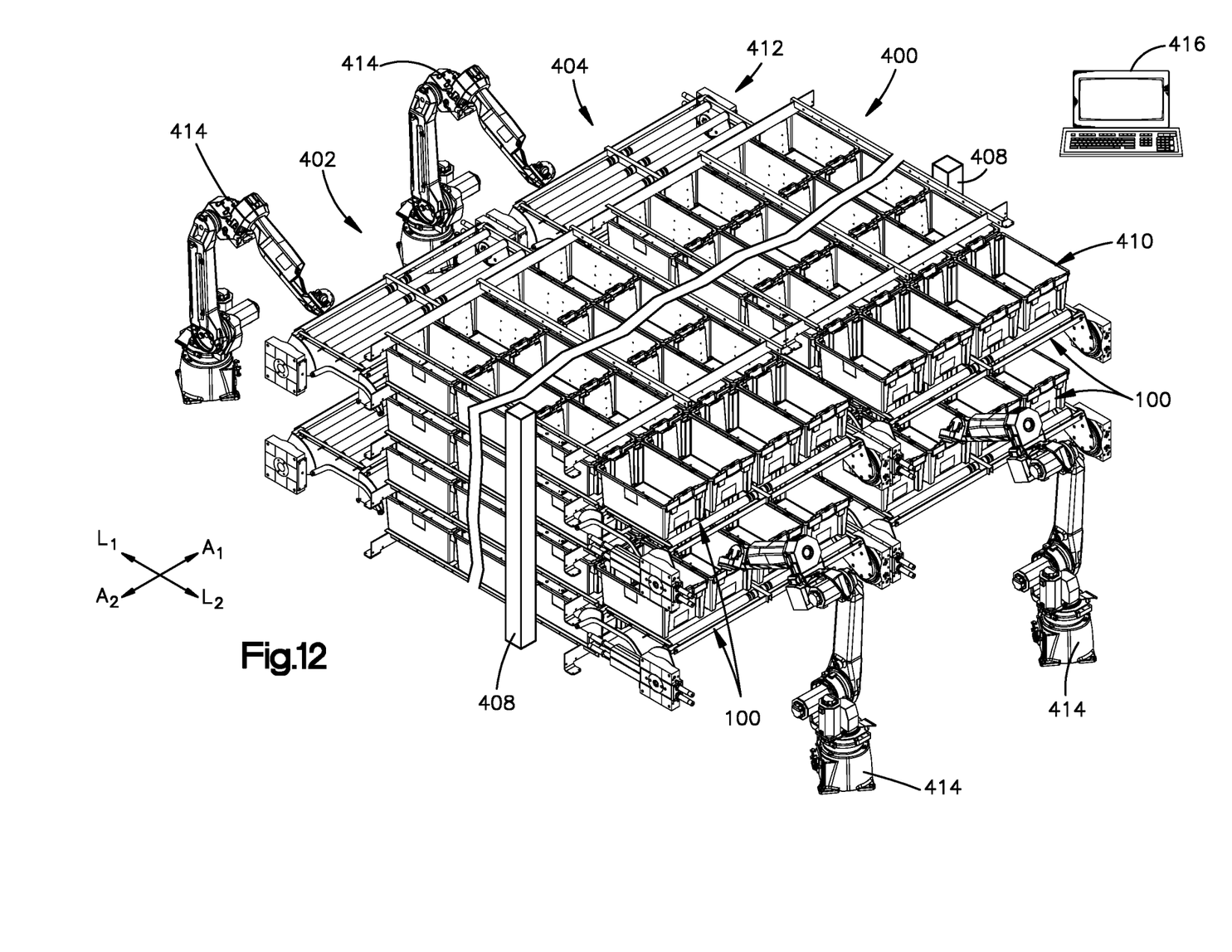
FIG. 12 shows a perspective view of a modular storage and retrieval system according to one embodiment that comprises a plurality of instances of the storage module of FIG. 1 and a plurality of inventory carriers.

Referring now to FIG. 12, a modular storage and retrieval system 400 is shown that comprises a plurality of instances of the storage module 100 of FIG. 1, each supporting a plurality of inventory carriers 300. In general, storage systems of the disclosure can include at least one vertical stack of storage modules that comprises at least two of the storage modules stacked on top of one another along the vertical direction V. In at least some embodiments, the system 400 can include the inventory carriers 300 supported by the system 400, although it will be understood that the system 400 can be made and sold without the inventory carriers 300.

The storage system 400 comprises a first system end 410, and a second system end 412 that is spaced from the first system end 410 along the first longitudinal direction $L_1$. The storage system 400 includes a plurality of instances of the storage module 100, each extending from the first system end 410 to the second system end 412. The plurality of storage modules 100 includes a first vertical stack 402 of the storage modules 100 that comprises a plurality (e.g., at least two) of the storage modules 100 stacked on top of one another along the vertical direction V. The storage system 400 further includes a second vertical stack 404 of the storage modules 100 that comprises a plurality (e.g., at least two) of the storage modules 100 stacked on top of one another along the vertical direction V. The second vertical stack 404 can be offset from the first vertical stack 402 along the first lateral direction $A_1$.

Each storage module 100 of the system 400 can be independently operated such that the inventory carriers 300 of each storage module 100 can be driven around their corresponding conveying loop independently of the inventory carriers 300 of other storage modules 100 being driven around their corresponding conveying loop. Although two vertical stacks 402 and 404, each having two storage modules 100 are shown, it will be understood that the number of vertical stacks and storage modules 100 in each vertical stack can vary from that shown. In particular, modular storage and retrieval systems of the disclosure can include at least one vertical stack of storage modules 100 or more than one vertical stack of storage modules 100. Further, each vertical stack of storage modules 100 can have at least two storage modules 100 stacked on top of one another or more than two storage modules 100. Thus, height, width, and length of the system 400 can be scalable to fit within a desired volume in a warehouse space.

The modular storage and retrieval storage system 400 can include supports 408 that are coupled to the storage modules 100 in each vertical stack 402 and 404 so as to maintain the storage modules 100 in a stacked relation. The supports 408 can further be coupled to the storage modules 100 so as to attach the vertical stacks 402 and 404 of storage modules 100 to one another. The supports 408 can combine to form a frame of the system 400.

The storage modules 100 can be stacked on top of one another so that the space between each inventory carrier 300 and a storage module 100 immediately over top of the inventory carrier 300 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the inventory carriers, such as a spacing that is no more than 20 percent of the height of the inventory carrier, such as no more than 15 percent of the height of the inventory carrier, such as no more than 10 percent of the height of the inventory carrier, or such as no more than 5 percent of the height of the inventory carrier. Storage density is inversely proportional to the distance between an inventory carrier and the storage module immediate over top of the inventory carrier 300. Thus, as this distance is decreased, the storage density increases.

The modular storage and retrieval system 400 can also include at least one robotic manipulator 414. For example, the system 400 can include at least one robotic manipulator 414 that services the first module end 102 of each vertical stack of storage modules 100. The system 400 can additionally or alternatively include at least one robotic manipulator 414 that services the second module end 104 of each vertical stack of storage modules 100 as shown. In some embodiments, the manipulators 414 at the first module ends 102 can be used to stow inventory items or inventory carriers 300 in the storage modules 100, and the manipulators 414 at the second module end 104 can be used to retrieve inventory items or inventory carriers 300 from the storage modules 100. Alternative embodiments can include at least one manipulator 414 on only one end of a vertical stack, the at least one manipulator 414 configured to perform both stowing and retrieving operations. Additionally or alternatively, one or more of the robotic manipulators 414 can service multiple vertical stacks of storage modules 100. Although not shown, in some embodiments, the at least one robotic manipulator 414 can be configured to move vertically and/or horizontally to service the storage modules 100 of the system 400. For example, a robotic manipulator 414 can be mounted on a horizontal and/or vertical track to enable it to move with respect to the vertical stacks.

Each robotic manipulator 414 can be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). Each robotic manipulator 414 can include any suitable type and number of sensors disposed throughout the robotic manipulator 414 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 414, including an end effector. The sensors can be in communication with a controller 416. Note that controller 416 can implement (or be the same as) controller 150, or can be separate from controller 150. The controller 416 can be local to the robotic manipulator 414 (e.g., a robotic manipulator controller) or can be separate from, but in communication with, the robotic manipulator 414. In this manner, the controller 416 can control the operation of the robotic manipulator 414 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

Other material conveyance devices (not shown) may also be disposed adjacent to the robotic manipulators 414. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 414.

In operation, a method of operating the system 400 comprises causing a desired inventory carrier 300 in the system 400 to be identified to either retrieve an inventory item from or stow an inventory item into. Further, the method comprises causing a location of the inventory carrier 300 in the system 400 to be identified. Identifying the location can include identifying the storage module 100 that supports the identified inventory carrier 300 and optionally the position of the inventory carrier 300 on the identified storage module 100. Once the location is identified, the method comprises causing the inventory carriers 300 of the identified storage module 100 to be translated around the conveying loop of the identified storage module 100 until the desired inventory carrier 300 is presented at a desired one of the first and second ends 102 and 104 of the identified storage module 100. The method then comprises retrieving an inventory item from, or stowing an inventory item into, the desired inventory carrier 300. This step can be performed by a human who manually retrieves an inventory item from the desired inventory carrier 300 or stows the inventory item into the desired inventory carrier 300. Alternatively, this step can comprise causing a robotic manipulator 414 to move so as to retrieve an inventory item from the desired inventory carrier, or stow an inventory item into the desired inventory carrier 300. In some embodiments, the human or robotic manipulator 414 can retrieve the desired inventory carrier 300 itself from the system 400, and then the inventory item can be retrieved from the desired inventory carrier 300. The inventory carrier 300 can then be stowed by the human or a robotic manipulator 414 onto a desired one of the storage modules 100. In so doing, the inventory carrier 300 can be stowed onto the same storage module 100 from which the inventory carrier 300 was retrieved for can be stowed in a different storage module. At least one, up to all, of these steps can be controlled by the controller 416.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A storage module configured to store inventory items, the storage module comprising:
   a first module end, and a second module end spaced from the first module end along a first longitudinal direction;
   a first conveyor segment, and a second conveyor segment spaced below the first conveyor segment along a vertical direction such that the first and second conveyor segments comprise upper and lower conveyor segments, the upper and lower conveyor segments each extending between the first and second module ends and each having first and second terminal free ends that are spaced from one another along the longitudinal direction;
   a first vertical lift disposed at the first terminal free ends and configured to move to transfer inventory carriers between the first and second conveyor segments at the first module end; and
   a second vertical lift disposed at the second terminal free ends and configured to move to transfer inventory carriers between the upper and lower conveyor segments at the second module end,
   wherein:
   i) the storage module comprises only upper and lower conveyor segments between the first and second vertical lifts,
   ii) the upper conveyor segment, the lower conveyor segment, the first vertical lift, and the second vertical lift together define a conveying loop in a vertical plane, and
   iii) the storage module is configured to translate inventory carriers around the conveying loop until a desired one of the inventory carriers is presented at one of the first module end and the second module end.

2. The storage module of claim 1, wherein at least one of the first and second vertical lifts includes a conveyor segment, and the at least one of the first and second vertical lifts is configured to move the conveyor segment between a raised position and a lowered position.

3. The storage module of claim 2, wherein, in the raised position, the conveyor segment is vertically aligned with the upper conveyor segment, and in the lowered position, the conveyor segment is vertically aligned with the lower conveyor segment.

4. The storage module of claim 2, wherein the at least one of the first and second vertical lifts comprises at least one linkage that is configured to move the conveyor segment between the raised and lowered positions.

5. The storage module of claim 4, wherein the at least one linkage includes a plurality of links that are interconnected with one another.

6. The storage module of claim 5, wherein the at least one vertical lift includes at least one actuator that is configured to move the links of the at least one linkage relative to one another so as to move the conveyor segment between the raised position and the lowered position.

7. The storage module of claim 4, wherein the at least one linkage includes a first link, a second link, and a third link, and wherein the first and second links are pivotally connected to the conveyor segment, and the third link is pivotally connected to the both the first and second links.

8. The storage module of claim 7, wherein the first link defines a first pivot point that is fixed relative to the upper and lower conveyor segments, a second pivot point that is pivotally coupled to a first end of the third link, and a third pivot point that is pivotally coupled to the conveyor segment.

9. The storage module of claim 7, wherein the third link is a bar having a first end that defines a first pivot point and a second end that defines a second pivot point, the first pivot point being pivotally coupled to the first link and the second pivot point being pivotally coupled to the second link.

10. The storage module of claim 7, wherein the second link defines a first pivot point that is pivotally coupled to an actuator, a second pivot point that is pivotally coupled to the third link, and a third pivot point that is pivotally coupled to the conveyor segment.

11. The storage module of claim 10, comprising a rotatory actuator configured to rotate the second link, and wherein the linkage is configured such that rotation of the second link causes movement of the first link, the third link, and the conveyor segment.

12. A storage system, comprising:
the storage module of claim 1 and
a plurality of the inventory carriers.

13. The storage system of claim 12, wherein each inventory carrier has an overall carrier width along a first lateral direction, perpendicular to the first longitudinal direction, and the storage module has an overall module width along the first lateral direction, perpendicular to the first longitudinal direction, the overall module width being greater than the overall carrier width such that the storage module is configured to support at least two of the inventory carriers side-by-side along the first lateral direction.

14. A storage system configured to store inventory items, the storage system comprising:
a plurality of instances of the storage module of claim 1, the plurality of instances including at least one vertical stack that includes at least two instances of the storage module stacked on top of one another along a vertical direction.

15. The storage system of claim 14, wherein the plurality of instances includes at least first and second vertical stacks, each including at least two instances of the storage module stacked on top of one another along a vertical direction, the first and second vertical stacks being offset from one another along a lateral direction.

16. The storage system of claim 14, comprising at least one robotic manipulator configured to perform operations that include at least one of (i) retrieving at least one of an inventory item and an inventory carrier from one or more instances of the storage module and (ii) stowing at least one of an inventory item and an inventory carrier onto one or more instances of the storage module.

* * * * *